United States Patent

Stirrat et al.

[15] 3,643,181
[45] Feb. 15, 1972

[54] AMPLITUDE AND/OR FREQUENCY-MODULATED PARAMAGNETIC RESONANCE OSCILLATOR

[72] Inventors: William A. Stirrat, Freehold Township, Monmouth County, N.J.; William L. Rollwitz; Gilbert A. Persyn, both of San Antonio, Tex.

[73] Assignee: The United States of America as represented by the Secretary of the Army

[22] Filed: June 11, 1970

[21] Appl. No.: 45,517

[52] U.S. Cl. .................................. 332/17, 331/94, 324/.5
[51] Int. Cl. .................................................. H03b 17/00
[58] Field of Search .............. 332/17; 331/94, 3; 324/.5

[56] References Cited

UNITED STATES PATENTS

| | | | |
|---|---|---|---|
| 2,103,847 | 12/1937 | Hansell | 332/17 |
| 2,589,494 | 3/1952 | Hershberger | 325/.5 |
| 3,085,196 | 4/1963 | Martin | 324/.5 |
| 3,167,706 | 1/1965 | Doyle | 324/.5 |
| 3,172,055 | 3/1965 | Abrahamson et al. | 331/94 |

*Primary Examiner*—John Kominski
*Attorney*—Harry M. Saragovitz, Edward J. Kelly, Herbert Berl and Gordon W. Kerr

[57] ABSTRACT

This oscillator includes a pair of radiofrequency (RF) coils orthogonally disposed to each other and coupled to a magnetized paramagnetic sample. At paramagnetic resonance, the two coils are effectively coupled and a feedback path is completed through one or more amplifiers which connect the two RF-coils. The oscillator can be both frequency- and amplitude-modulated.

3 Claims, 2 Drawing Figures

INVENTORS,
WILLIAM A. STIRRAT, WILLIAM L.
ROLLWITZ & GILBERT A. PERSYN

BY: Gordon W. Kerr,
Harry M. Saragovitz,
Edward J. Kelly &
Herbert Berl       ATTORNEYS.

AMPLITUDE AND/OR FREQUENCY-MODULATED PARAMAGNETIC RESONANCE OSCILLATOR

This invention relates to an oscillator utilizing the phenomenon of paramagnetic resonance of either nuclei or free electrons. More specifically, the novel and useful oscillator described herein includes a paramagnetic sample as the major frequency-determining element thereof. The oscillator comprises two radiofrequency (RF) coils juxtaposed to the paramagnetic sample and mutually decoupled, that is, magnetic coupling between the RF-coils is less than the magnetic resonance signal linking the two coils. A feedback loop comprising one or more amplifiers and a phase shifter connects the two RF-coils. Under these conditions, oscillation will take place very close to the resonant frequency of the sample if a magnetic field is applied in a direction orthogonal to the two decoupled or orthogonal RF-coils. The two RF-coils must have their magnetic fields orthogonal to each other, for example, if helical-(or solenoid) type coils are used their axes would be arranged orthogonal to each other and with the direct magnetic field orthogonal to both coil axes. For example, each may be aligned with $x$, $y$ and $z$-axes of a coordinate system with the paramagnetic material at the origin thereof. The oscillator can be tuned over a wide frequency range simply by varying the direct magnetic field. The oscillator can be frequency modulated by superimposing modulation on the steady or direct magnetic field. An automatic level control is associated with the amplifier of the oscillator to prevent the signal from building up to levels which would cause distortion or harmonics. An amplitude-modulating signal can be superimposed on the output voltage of the level control circuit. The frequency and amplitude-modulation are independent of each other and can be utilized separately or simultaneously. Since the paramagnetic sample has an extremely high effective Q, a stable, narrow band oscillator results.

It is thus an object of the invention to provide an improved modulated oscillator utilizing paramagnetic resonance.

Another object of the invention is to provide a frequency or amplitude-modulated oscillator which can be easily tuned over a wide range and has very good spectral characteristics as well as low distortion.

Another object of the invention is to provide an oscillator which can be simultaneously frequency and amplitude-modulated.

These and other objects will become apparent from the following detailed description and drawings, in which.

Paramagnetic resonance is observed when an alternating magnetic field is applied to a paramagnetic in which a direct magnetic field exists at right angles or orthogonal to the applied alternating field. At resonance the paramagnetic material or sample absorbs energy from the applied alternating field. The resonant frequency is very close to the Larmor frequency and is directly proportional to the applied direct magnetic field. This phenomenon involves precession of elementary magnetic moments around the direct magnetic field vector and is analogous to gyroscopic precession in a gravitational field. Resonance or absorption occurs when the precessional frequency of the magnetic moments equals that of the orthogonally applied alternating field. There are several types of paramagnetic resonance, e.g.; nuclear magnetic resonance (NMR), electron paramagnetic resonance (EPR), and nuclear quadrupole resonance (NQR).

Figure 1:
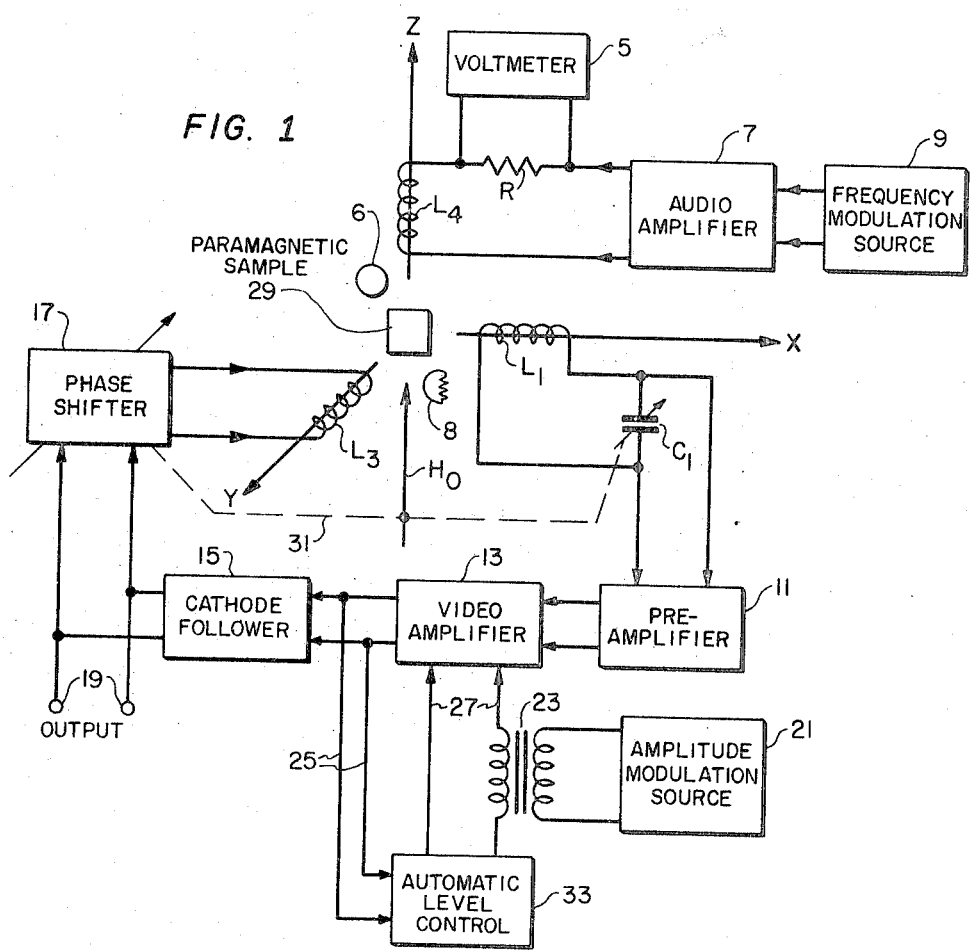
FIG. 1 is a diagram of preferred embodiment of the novel oscillator.

The modulated oscillator of FIG. 1 includes a paramagnetic sample or material 29. The sample 29 is shown as located at the origin of a coordinate system comprising mutually orthogonal axes $x$, $y$ and $z$. The coils are juxtaposed to the sample 29 with their magnetic fields aligned with the axes of the coordinate system. A direct magnetic field $H_o$ is aligned along the $z$-axis. The first RF-coil $L_1$ is connected to the input of preamplifier 11. A variable capacitor $C_1$ is connected across $L_1$ to form a parallel resonant circuit. The output of preamplifier 11 is applied to video amplifier 13 and in turn to cathode follower 15. All three of these amplifiers are designed to have the required phase shift vs. frequency characteristic so that the oscillator can be tuned over a wide frequency range. The cathode follower output is applied to a variable phase shifter 17, the output of which is applied to the second RF-coil $L_3$, which is aligned with the $y$-axis. The phase shifter 17 is variable and is adjusted in unison with the capacitor $C_1$ and the direct magnetic field $H_0$, as indicated by the mechanical connection 31 between these elements. The output terminals 19 are connected to the output of the cathode follower. A third coil $L_4$ has its axis along the $z$-axis. Frequency modulating voltages are applied to coil $L_4$ via FM-source 9 and audio amplifier 7. The voltmeter 5 and series resistor R permit the modulation signal level to be monitored. The magnetic field of $L_4$ is superimposed on the direct field $H_o$. This varies the sample resonant frequency and frequency-modulates the oscillator. If helical coils are utilized with their axes aligned with the coordinate axes, it may be necessary to use adjustable field-bending coils such as indicated at 6 and 8 in FIG. 1, to provide a vernier adjustment of the alternating magnetic field directions at the sample, to maintain the required magnetic field orthogonality. These small loops may be simply copper rings as shown at 6 or may include a resistor, as shown at 8. These coils are adjustable or movable in the vicinity of the sample 29 by a mechanism not illustrated.

The automatic level control circuit 33 has its input connected to the output of video amplifier 13 via leads 25 and its output controls the level or gain of amplifier 13 via leads 27. The circuit 33 is somewhat analogous to an AGC or AVC system of a receiver in that it maintains the signal or oscillation level at a constant value. This keeps the drive signal to $L_3$ and the sample constant. This makes for stable oscillation and permits operation well below saturation so that there is no nonlinearity in the frequency-controlling portion of the oscillator. The level control circuit 33 may operate by comparing the average value of the rectified signal level with an internal fixed DC voltage and using the resulting error signal on leads 27 to control the video gain of 13. To achieve amplitude modulation, a modulation voltage is superimposed on this error signal via transformer 23 from AM source 21.

Oscillation is started by noise from the output of the cathode follower 15, which is applied to coil $L_3$ via phase shifter 17. The noise will have a component at the sample resonant frequency. This component is absorbed by the paramagnetic sample and then coupled to the second RF-coil $L_1$. It should be noted that the orthogonal coils $L_1$ and $L_3$ are physically decoupled so that ordinary magnetic coupling between them is very close to zero, however the resonating paramagnetic sample acts like a high Q-resonant circuit coupling the two coils together, as will be seen in the equivalent circuit of FIG. 2. The output of coil $L_1$ is then fed to the input of preamplifier 11 and oscillations will build up in the same manner as in any feedback-type oscillator. The phase shifter is adjusted so that the proper phase relations exist to sustain oscillation. As mentioned above, the level control circuit limits the oscillation amplitude buildup to a value which minimizes distortion and overdriving.

The parallel resonant circuit $L_1$-$C_1$ is tuned so that the paramagnetic resonant frequency falls somewhere in its passband. This resonant circuit filters noise from the circuit and reduces the gain required of the amplifiers. The center frequency of the oscillator is adjusted by varying the $H_o$ magnetic field. For appreciable frequency changes, the phase shifter and $C_1$ must be adjusted to match or track the new frequency and ganged frequency-adjusting means 31 is shown for this purpose.

Figure 2:
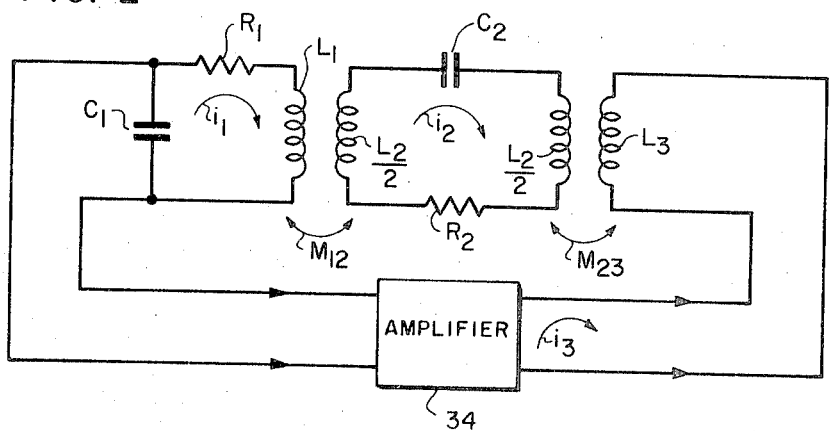
FIG. 2 is a simplified equivalent circuit of the oscillator of FIG. 1.

In the simplified equivalent circuit of FIG. 2, the coils $L_1$ and $L_3$ and capacitor $C_1$ are the same as the correspondingly referenced elements of FIG. 1. The amplifier 34 represents all of amplifiers of FIG. 1. The magnetic resonance signal of the sample 29 can be considered the equivalent of the resonant circuit comprising $C_2$, $L_2/2$, $R_2$ and $L_2/2$ which are shown coupling the two RF-coils. The characters $M_{12}$ and $M_{23}$ represent the mutual coupling between the adjacent coils. It can be shown that the frequency of oscillation of the circuit of FIG. 2, $f$, is given by the following formula:

$$f = \frac{Q_1 f_1}{Q_1 + Q_2} - \frac{Q_1 f_0}{Q_1 + Q_2} + f_0 \qquad (1)$$

where $Q_1 = 2\pi f L_1/R_1$, $Q_2 = 2\pi f L_2/R_2$, $f_o =$ the magnetic resonant frequency, which is the resonant frequency of $L_2$ and $C_2$, and $f_1$ is the resonant frequency of $L_1$ and $C_1$. $Q_1$ is the effective Q of the external parallel resonant circuit comprising $L_1$ and $C_1$ and $Q_2$ is the effective Q of the paramagnetic sample, which is several orders of magnitude larger than $Q_1$. It can be seen that if $Q_2 >> Q_1$, the oscillator frequency, $f$, given by equation (1) is approximately equal to $f_o$, the paramagnetic resonant frequency, since the first two terms on the right side of (1) are much smaller than unity. As stated above, the paramagnetic resonant frequency varies directly with the steady magnetic field, $H_o$.

Bandwidths of 85.2 Hertz have been obtained with this oscillator, using water as the paramagnetic material, at an oscillation frequency of 6 megahertz. The harmonic output was 80 db. below the carrier or fundamental oscillation frequency level. When frequency modulated, the oscillator had pure FM spectral output with spurious signals 80 db. below the carrier. Wide frequency deviation was obtained (±185 kilohertz at a 6 megahertz carrier). Similar spectral purity was obtained when amplitude modulated. While the drawing shows both amplitude and frequency modulation means connected to the same oscillator, either one or the other may be used exclusively, or both may be used simultaneously.

One of the important advantages of this oscillator is its ease of tuning. The center frequency may be manually or automatically changed or swept by means of a simple rheostat or other means for varying the direct current of an electromagnet which produces the direct field $H_o$.

While the invention has been described in connection with a preferred embodiment, obvious modifications thereof will occur to those skilled in the art, hence the invention should be limited only by the scope of the appended claims.

What is claimed is:

1. An oscillator which includes a paramagnetic material as the major frequency-determining element, comprising, a pair of radiofrequency coils coupled to said material, magnetically orthogonal to each other and mutually decoupled from each other, means to produce a direct magnetic field within said material along an axis orthogonal to both said radiofrequency coils, a third coil disposed along said axis for producing a magnetic field that is coupled to said material and is superposed on said direct magnetic field, a frequency-modulation source connected to said third coil for energizing said third coil to produce its magnetic field whereby said direct magnetic field pulsates in accordance with the output of said frequency-modulation source to frequency-modulate said oscillator, and a feedback loop connected between said radiofrequency coils, said feedback loop comprising at least one amplifier.

2. The oscillator of claim 1 wherein said feedback loop comprises a video amplifier and a variable phase shifter, and an automatic level control circuit, the input of said level control circuit being the output of said video amplifier, the output of said level control circuit being applied to said video amplifier as a gain control signal; and means to superimpose an amplitude-modulating voltage on said gain control signal.

3. The oscillator of claim 2 further including a variable capacitor connected in parallel with one of said radiofrequency coils, said coil and capacitor being tuned to a passband which includes the resonant frequency of said paramagnetic material.

* * * * *